United States Patent
Dong et al.

(10) Patent No.: US 9,563,775 B2
(45) Date of Patent: *Feb. 7, 2017

(54) SECURITY CO-PROCESSOR BOOT PERFORMANCE

(71) Applicant: Intel Corporation, Santa Clara, CA (US)

(72) Inventors: Guo Dong, Baoshan (CN); Jiewen Yao, Shanghai (CN); Vincent J. Zimmer, Federal Way, WA (US); Michael A. Rothman, Puyallup, WA (US)

(73) Assignee: intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/982,697

(22) Filed: Dec. 29, 2015

(65) Prior Publication Data

US 2016/0188881 A1    Jun. 30, 2016

Related U.S. Application Data

(63) Continuation of application No. 13/976,041, filed as application No. PCT/CN2013/072732 on Mar. 15, 2013, now Pat. No. 9,223,983.

(51) Int. Cl.
G06F 3/00 (2006.01)
G06F 21/57 (2013.01)
(Continued)

(52) U.S. Cl.
CPC ............. G06F 21/575 (2013.01); G06F 21/71 (2013.01); *G06F 9/4401* (2013.01); *G06F 2221/034* (2013.01)

(58) Field of Classification Search
CPC combination set(s) only.
See application file for complete search history.

(56) References Cited

U.S. PATENT DOCUMENTS 5,270,627 A * 12/1993 Rehse ................ G05B 19/4148
                                                        318/560
5,301,277 A *  4/1994 Kanai ................... G06F 13/102
                                                        379/88.16
(Continued)

FOREIGN PATENT DOCUMENTS

EP            1953666 A2     8/2008

OTHER PUBLICATIONS

European Search Report for Application No. 13877987.1-1870/2973139, dated Sep. 23, 2016, 8 pages.

(Continued)

*Primary Examiner* — Sayed Beheshti Shirazi
(74) *Attorney, Agent, or Firm* — Barnes & Thornburg LLP

(57) ABSTRACT

Technologies for improving platform initialization on a computing device include beginning initialization of a platform of the computing device using a basic input/output system (BIOS) of the computing device. A security co-processor driver module adds a security co-processor command to a command list when a security processor command is received from the BIOS module. The computing device establishes a periodic interrupt of the initialization of the platform to query the security co-processor regarding the availability of a response to a previously submitted security co-processor command, forward any responses received by the security co-processor driver module to the BIOS module, and submit the next security co-processor command in the command list to the security co-processor.

18 Claims, 4 Drawing Sheets

(51) Int. Cl.
*G06F 21/71* (2013.01)
*G06F 9/44* (2006.01)

(56) References Cited

U.S. PATENT DOCUMENTS

| | | | | |
|---|---|---|---|---|
| 6,321,323 | B1* | 11/2001 | Nugroho | G06F 8/443 |
| | | | | 711/103 |
| 6,401,202 | B1 | 6/2002 | Abgrall | |
| 6,789,147 | B1* | 9/2004 | Kessler | 710/200 |
| 6,792,031 | B1* | 9/2004 | Sriram | H04B 1/7095 |
| | | | | 370/320 |
| 6,968,061 | B2* | 11/2005 | Houlberg | H04L 9/0894 |
| | | | | 380/277 |
| 2003/0188127 | A1* | 10/2003 | So | G06F 9/3861 |
| | | | | 712/34 |
| 2004/0128553 | A1* | 7/2004 | Buer | H04L 63/045 |
| | | | | 713/154 |
| 2005/0060577 | A1* | 3/2005 | Barrett | G06F 9/30032 |
| | | | | 726/4 |
| 2006/0095598 | A1* | 5/2006 | Prevost | G06Q 20/341 |
| | | | | 710/10 |
| 2006/0161921 | A1* | 7/2006 | Kissell | G06F 8/4442 |
| | | | | 718/102 |
| 2006/0179483 | A1* | 8/2006 | Rozas | G06F 21/57 |
| | | | | 726/22 |
| 2006/0259673 | A1* | 11/2006 | Bancel | G06F 11/28 |
| | | | | 710/110 |
| 2006/0277448 | A1* | 12/2006 | Koto | G06F 11/1417 |
| | | | | 714/55 |
| 2008/0010516 | A1* | 1/2008 | Lu | G06F 9/4401 |
| | | | | 714/15 |
| 2008/0127229 | A1* | 5/2008 | Keener | G06F 13/385 |
| | | | | 719/325 |
| 2008/0163383 | A1* | 7/2008 | Kumar | G06F 21/575 |
| | | | | 726/29 |
| 2009/0183245 | A1* | 7/2009 | Simpson | G06F 21/62 |
| | | | | 726/7 |
| 2011/0314469 | A1* | 12/2011 | Qian | H04L 49/9057 |
| | | | | 718/1 |
| 2013/0006866 | A1* | 1/2013 | Pendakur | G06Q 30/0241 |
| | | | | 705/50 |
| 2013/0007873 | A1* | 1/2013 | Prakash | G06F 21/31 |
| | | | | 726/18 |
| 2013/0031374 | A1* | 1/2013 | Thom | G06F 21/57 |
| | | | | 713/189 |
| 2013/0346732 | A1* | 12/2013 | Igura | G06F 9/524 |
| | | | | 712/244 |
| 2014/0047261 | A1* | 2/2014 | Patiejunas | G06F 1/266 |
| | | | | 713/330 |
| 2014/0095468 | A1* | 4/2014 | Aingaran | G06F 17/30501 |
| | | | | 707/713 |

OTHER PUBLICATIONS

Rothman, Michael A., "Reducing Plafform Boot Times: UEFI-based Performance Optimization," Intel Corp., Jun. 30, 2009, retrieved from the Internet: URL: https://web.archive.org/web/20110915142648/http://download.intel.com/design/intarch/papers/322253.pdf, retrieved Sep. 13, 2016.

Hallinan, Chris, "Reducing Boot Time: Techniques for Fast Booting," Dec. 1, 2008, Retrieved from the Internet: URL:http://www.nxp.com/files/training_pdf/VFTF09_MONTAVISTA_LINUXBOOT.pdf, retrieved on Sep. 14, 2016.

Notice of Second Preliminary Rejection for Korean Patent Application No. 10-2015-7021704, dated Nov. 1, 2016, 3 pages.

* cited by examiner

SECURITY CO-PROCESSOR BOOT PERFORMANCE

CROSS-REFERENCE TO RELATED APPLICATION

This application is a continuation application of U.S. application Ser. No. 13/976,041, entitled "Security Co-Processor Boot Performance," which was filed on Jun. 26, 2013, and which issued as U.S. Pat. No. 9,223,983 on Dec. 29, 2015.

BACKGROUND

Trusted platform modules (TPM) and other security co-processors are commonly used to enhance the security of a computing device. Such security co-processors typically perform various cryptographic functions and are often used to attest to the integrity of a platform. Additionally, because security co-processors are generally capable of performing cryptographic procedures, they are in some circumstances used to offload those cryptographic procedures from the main processor of the computing device.

In today's society, speed is fundamental to a consumer's enjoyment of various computing devices. For example, ultrabooks have emerged on the market with a central focus on an increased boot speed compared to standard notebook computers. Further, some standards for operating systems and computer platforms require manufactures to pay attention to boot speed by, for example, requiring the computing device to complete Unified Extensible Firmware Interface (UEFI) basic input/output system (BIOS) Power-On Self-Test (POST) in only a couple seconds. Those standards ensure that computing devices boot quickly and that there is minimal downtime associated with server reboots. Further, the latency associated with booting a typical TPM is significant, which is contrary to those standards.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
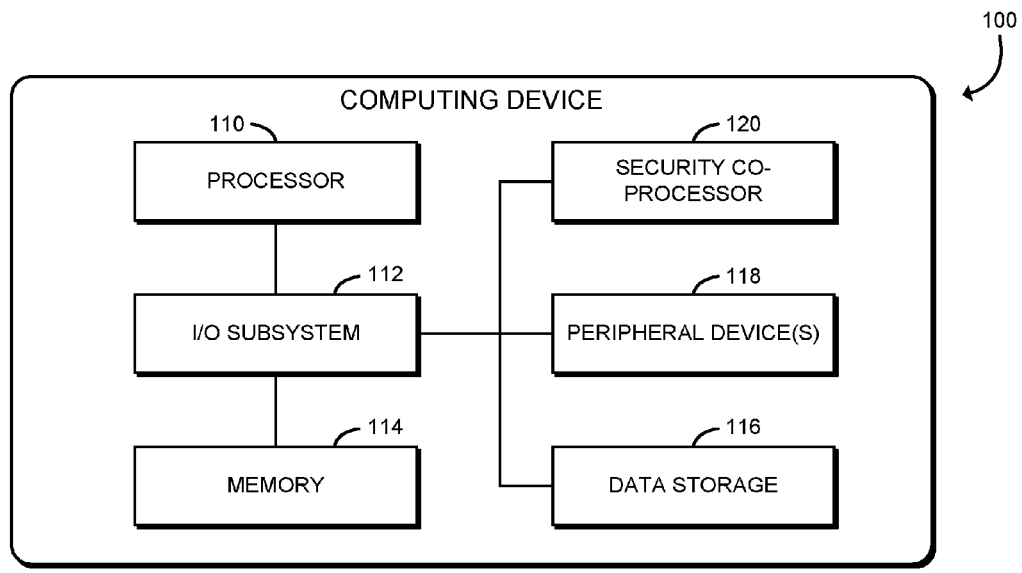
FIG. 1 is a simplified block diagram of at least one embodiment of a computing device for improving platform initialization.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a computing device 100 for improved platform initialization is configured to allow the BIOS of the computing device 100 to continue the initialization process for other components of the computing device 100 while waiting on a response from the security co-processor. As discussed in detail below, this eliminates substantial latency associated with waiting on a response from the security co-processor for each of the security co-processor commands sent to the security co-processor.

The computing device 100 may be embodied as any type of computing device capable of improving platform initialization and performing the functions described herein. For example, the computing device 100 may be embodied as a cellular phone, smartphone, tablet computer, laptop computer, personal digital assistant, mobile Internet device, desktop computer, server, and/or any other computing/communication device. As shown in FIG. 1, the illustrative computing device 100 includes a processor 110, an input/output ("I/O") subsystem 112, a memory 114, a data storage 116, one or more peripheral devices 118, and a security co-processor 120. Of course, the computing device 100 may include other or additional components, such as those commonly found in a typical computing device (e.g., various input/output devices, communication circuitry, etc.), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The peripheral devices 118 of the computing device 100 may include any number of additional peripheral or interface devices. The particular devices included in the peripheral devices 118 may depend on, for example, the type and/or intended use of the computing device 100.

The security co-processor 120 may be embodied as any hardware component(s) or circuitry capable of performing the functions described herein. In some embodiments, the security co-processor 120 is capable of establishing a trusted execution environment. For example, the security co-processor 120 may be embodied as a trusted platform module (TPM), a manageability engine (ME), a converged security engine (CSE), or another out-of-band processor. In some embodiments, the security co-processor 120 is embodied as an out-of-band processor configured to operate independently and in an out-of-band manner relative to the processor 110.

Figure 2:
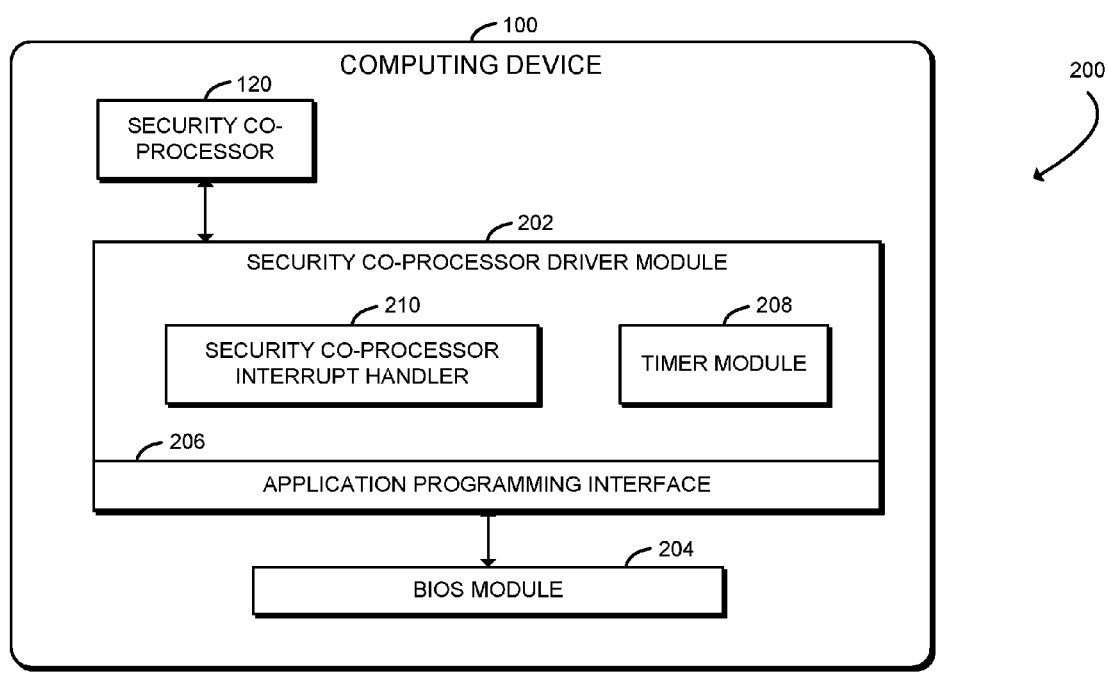
FIG. 2 is a simplified block diagram of at least one embodiment of an environment of the computing device of FIG. 1.

Referring now to FIG. 2, in use, the computing device 100 establishes an environment 200 for improving platform initialization. The environment 200 in the illustrative embodiment includes a security co-processor driver module 202 and a basic input/output system (BIOS) module 204. Additionally, the security co-processor driver module 202 further includes an application programming interface 206, a timer module 208, and a security co-processor interrupt handler 210. Each of the security co-processor driver module 202, the BIOS module 204, the application programming interface 206, the timer module 208, and the security co-processor interrupt handler 210 may be embodied as hardware, software, firmware, or a combination thereof.

The security co-processor driver module 202 manages the communication between the security co-processor 120 and the other components of the computing device 100. For example, as discussed in detail below, the security co-processor driver module 202 may transmit a security co-processor command to the security co-processor 120 for execution or other processing. Rather than waiting for the security co-processor to respond, which typically results in significant latency, in some embodiments, the security co-processor driver module 202 queries or otherwise polls the status of the security co-processor 120 to determine whether the response of the security co-processor 120 is ready and, if not, resumes other initialization as discussed in more detail below.

The BIOS module 204 may begin initialization of a platform of the computing device 100. As such, in some embodiments, the BIOS module 204 initializes and/or tests various components of the computing device 100 (e.g., input/output devices). Additionally, the BIOS module 204 may communicate and interact with the security co-processor driver module 202 using the application programming interface (API) 206 of the security co-processor driver module 202. In some embodiments, the BIOS module 204 does not communicate directly with the security co-processor 120 but instead uses the security co-processor driver module 202 as an intermediary. Accordingly, when the BIOS module 204 wants to send a security co-processor command, the BIOS module 204 sends that command to the security co-processor driver module 202 rather than to the security co-processor 120 directly. As discussed below, the security co-processor 120 adds that security co-processor command to a command list. Similarly, when a response from the security co-processor 120 is received by the security co-processor driver module 202, the response may in turn be forwarded to the BIOS module 204. Of course, in some embodiments, certain security co-processor commands may not elicit a response from the security co-processor 120 and/or may not need to be forwarded to the BIOS module 204 by the security co-processor driver module 202.

The timer module 208 is configured to establish a periodic interrupt of the initialization of the platform of the computing device 100. For example, in some embodiments, the timer module 208 may include or otherwise utilize a High Precision Event Timer (HPET) or other hardware timer. In one embodiment, the periodic interrupt established by the timer module 208 is a real-time interrupt that occurs whenever a clock of the computing device 100 reaches a certain value. Of course, in other embodiments, the timer module 208 may establish an interrupt that is aperiodic or has a period that changes (e.g., a set of periods). For example, the interrupt may occur less frequently during one BIOS phase than during another BIOS phase (i.e., the period may depend on the BIOS phase). When the interrupt occurs, the security co-processor interrupt handler 210 is invoked and control is transferred to the security co-processor interrupt handler 210 (e.g., from the BIOS module 204). As discussed in detail below, the security co-processor interrupt handler 210 checks the status of the security co-processor 120 (i.e., determines whether a response to a prior submitted security co-processor command is ready), and gets the response from the security co-processor 120 if it is ready.

If there are any security co-processor commands in the command list, the security co-processor interrupt handler 210 sends the next command in the list to the security co-processor 120 for processing, and control is returned from the security co-processor interrupt handler 210. Of course, as discussed above, the response may be forwarded to the BIOS module 204. In some embodiments, the command list is a list of security co-processor commands queued for transmission to the security co-processor 120. For example, in an embodiment in which the security co-processor 120 is a TPM, the command list is a list of TPM commands sent from the BIOS module 204 to the security co-processor driver module 202 (or TPM driver module in such an embodiment) to be queued for execution. In some embodiments, a security co-processor command is removed from the command list once it has been sent to the security co-processor 120 for execution. It should be appreciated that the order of execution of security co-processor commands in the command list may vary depending on the embodiment. For example, in one embodiment, a first-in, first out (FIFO) policy may be implemented. In another embodiment, a last-in, first-out (LIFO) policy may be used. In yet another embodiment, a more sophisticated policy may be used to determine the priority of execution of the security co-processor commands. The command list may be stored on the computing device 100 as any suitable data structure.

Figure 3:
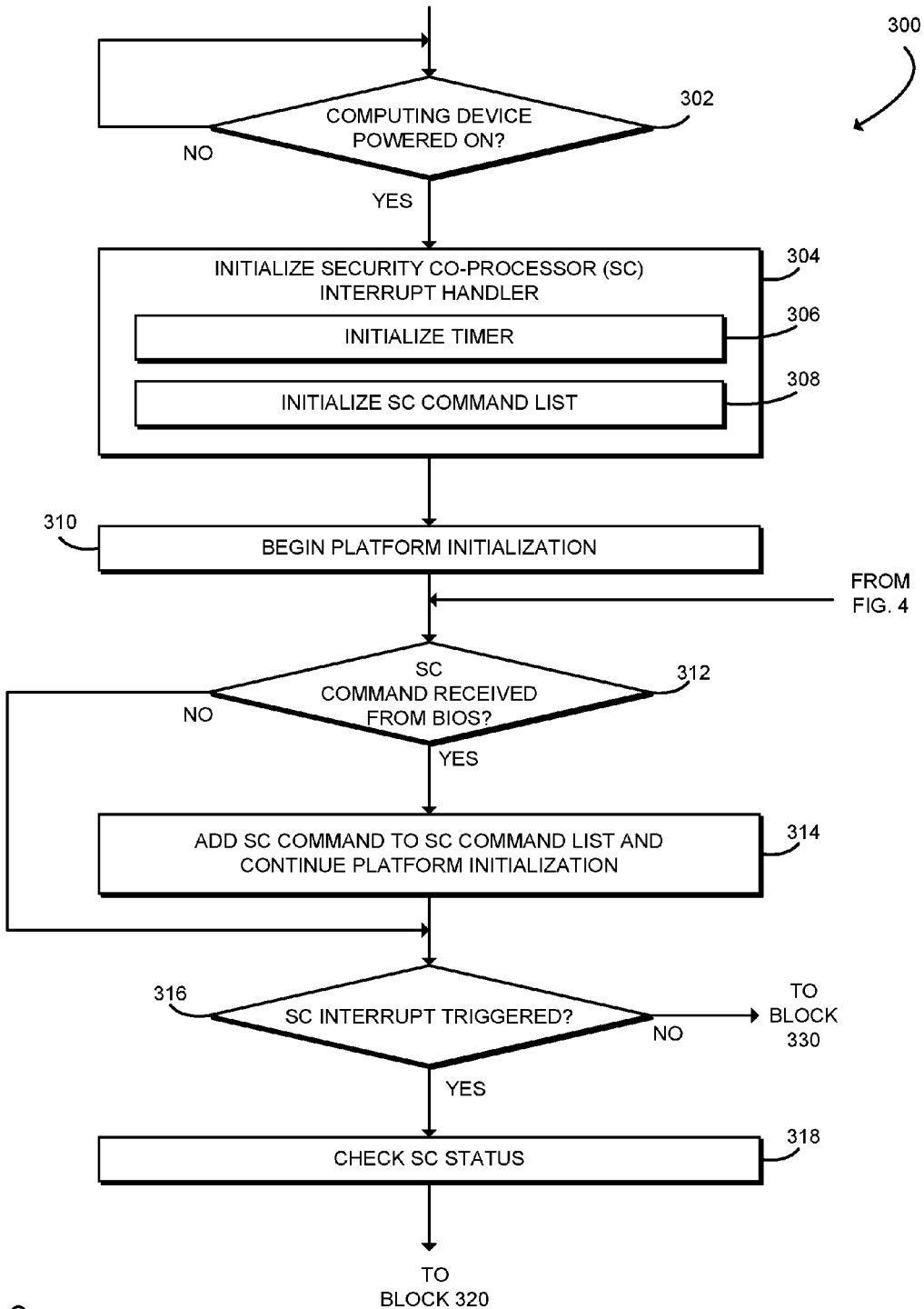
FIGS. 3 and 4 are a simplified flow diagram of at least one embodiment of a method for improving platform initialization on the computing device of FIG. 1.
Figure 4:
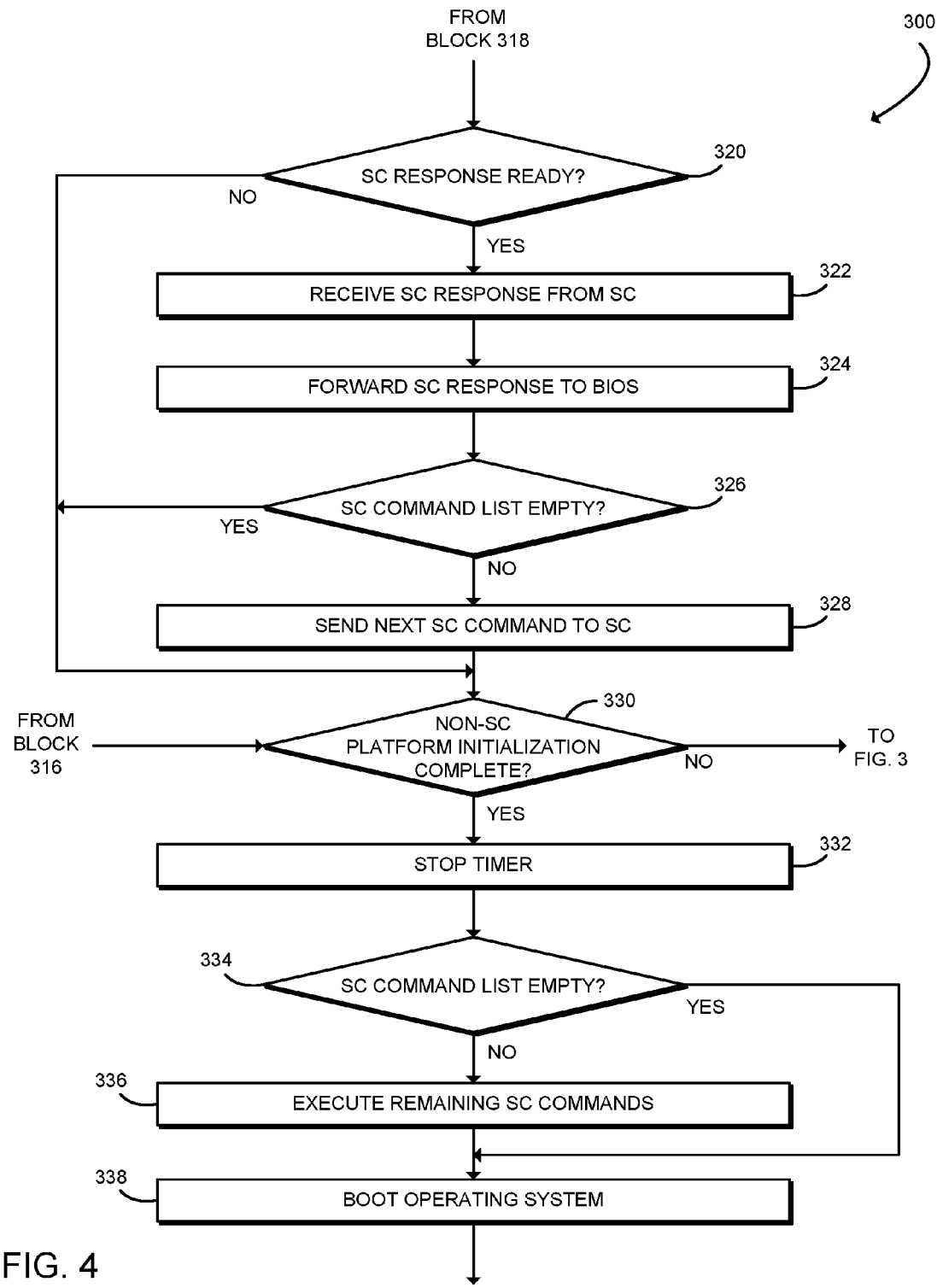

Referring now to FIGS. 3 and 4, in use, the computing device 100 may execute a method 300 for improving platform initialization by, for example, allowing the BIOS module 204 to continue the initialization process for other components of the computing device 100 while waiting on a response from the security co-processor 120 for each of the security co-processor commands sent to the security co-processor 120. The illustrative method 300 begins with block 302 of FIG. 3 in which the computing device 100 determines whether the computing device 100 is powered on. Once the computing device 100 has been powered on, the computing device 100 initializes the security co-processor interrupt handler 210 in block 304. In doing so, in block 306, the computing device 100 initializes a timer. That is, a periodic interrupt of the initialization of the platform is established as discussed above. Additionally, in block 308, the computing device 100 initializes a security co-processor command list (e.g., establishes an appropriate data structure).

In block 310, the computing device 100 begins platform initialization. For example, the computing device 100 may begin initializing and/or testing various components of the computing device 100 (e.g., various input/output components). In block 312, the computing device 100 determines whether a security co-processor command has been received by the security co-processor driver module 202 from the BIOS module 204 for transmission to the security co-processor 120. If so, the computing device 100 adds the security co-processor command to the security co-processor command list and continues platform initialization in block 314. In block 316, the computing device 100 determines whether the security co-processor interrupt (e.g., a periodic interrupt) has been triggered. If the computing device 100 determines, in block 312, that no security co-processor command has been received from the BIOS module 204, the method 300 advances directly to block 316. If the security co-processor interrupt has been triggered, the computing device 100 checks the status of the security co-processor 120 in block 318. For example, the computing device 100 determines whether a response for a previously submitted security co-processor command is available for transmission from the security co-processor 120 to the security co-processor driver module 202. Additionally, if the computing device 100 determines, in block 316, that the security co-processor interrupt has not been triggered, the method 300 advances to block 330 in which the computing device 100 determines whether the non-security co-processor platform initialization is complete as discussed in more detail below. In other words, in some embodiments, the security co-processor interrupt handler 210 of the computing device 100 performs the functions described in blocks 318-328 of the method 300 only in response to an occurrence of the security co-processor interrupt.

After checking the status of the security co-processor 120 in block 318, the method 300 advances to block 320 (see FIG. 4). If the computing device 100 determines that a response from the security co-processor 120 is available in block 320, the security co-processor driver module 202 of the computing device 100 receives the security co-processor response from the security co-processor 120 in block 322. However, if the computing device 100 determines that a response is not ready, the method 300 advances to block 330. In block 324, the security co-processor driver module 202 forwards the received response to the BIOS module 204. In some embodiments, the security co-processor driver module 202 signals an event to inform the BIOS module 204 that a security co-processor response is available. In such embodiments, the BIOS module 204 is able to retrieve the security co-processor response via event callback procedures if the response is needed by the BIOS module 204.

In block 326, the computing device 100 determines whether the security co-processor command list is empty. That is, the computing device 100 determines whether there are any security co-processor commands waiting for execution by the security co-processor 120. If the command list is empty, the method 300 advances to block 330. If, however, the command list is not empty, the security co-processor driver module 202 sends the next security co-processor command to the security co-processor 120 for execution in block 328. As discussed above, the priority of execution of the security co-processor commands in the command list may vary depending on the particular policy implemented. In block 330, the computing device 100 determines whether the non-security co-processor platform initialization is complete. In other words, the computing device 100 determines whether the security co-processor commands (i.e., the commands in the security co-processor command list) are the only commands left to be executed in order to complete platform initialization. Of course, in some embodiments, there may be additional commands to be executed by the BIOS module 204 that rely on a response to a security co-processor command from the security co-processor 120. In such an embodiment, the computing device 100 may determine, for example, whether the security co-processor commands are the only commands capable of currently being executed.

If the non-security co-processor platform initialization is complete, the computing device 100 stops the timer in block 332. That is, the computing device 100 stops interrupting the platform initialization. In block 334, the computing device 100 determines whether the security co-processor command list is empty. It should be appreciated that if the non-security co-processor platform initialization is complete and there are no security co-processor commands remaining in the command list for execution, the platform initialization is complete and an operating system of the computing device 100 may now be booted. Accordingly, in block 338, the computing device 100 boots the operating system. Of course, in some embodiments, the computing device 100 may include more than one operating system. As such, a default operating system may be booted, a user of the computing device 100 may be given an option to choose an operating system for booting, or some other boot policy may be implemented.

If the computing device 100 determines, in block 334, that the security co-processor command list is not empty, the computing device 100 executes the remaining security co-processor commands in block 336. For example, the security co-processor driver module 202 may follow the traditional approach of serially transmitting each security co-processor command remaining in the command list to the security co-processor 120 for execution, waiting for a response to each transmitted command before sending the next, and forwarding the responses to the BIOS module 204 to complete initialization. As discussed above, in some embodiments, one or more non-security co-processor commands may rely on a response to a security co-processor command in order to execute. In such an embodiment, if the non-security co-processor command becomes executable by the BIOS module 204 (e.g., due to a response from the security co-processor 120), the method 300 may return to block 330 in which the computing device 100 determines whether non-security co-processor platform initialization is complete. The computing device 100 may also re-enable the timer associated with the security co-processor interrupt. In other words, in such an embodiment, the computing device 100 may resume the procedures that permit non-security co-processor initialization of the platform while waiting on a response to a security co-processor command from the security co-processor 120. Returning to block 330, if the computing device 100 determines that the non-security co-processor initialization is not complete, the method 300 returns to block 312 of FIG. 3 in which the computing device determines whether a security co-processor command has been received by the security co-processor driver module 202 from the BIOS module 204.

Figure 5:
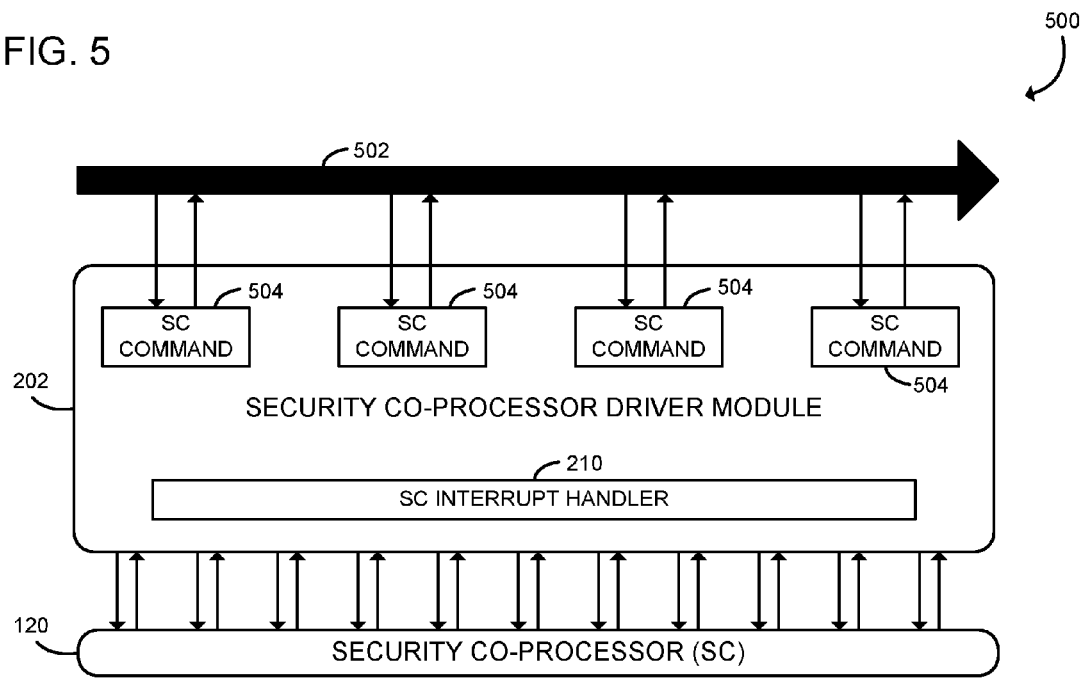
FIG. 5 is a simplified flow diagram of a boot flow for the computing device of FIG. 1.
Figure 6:
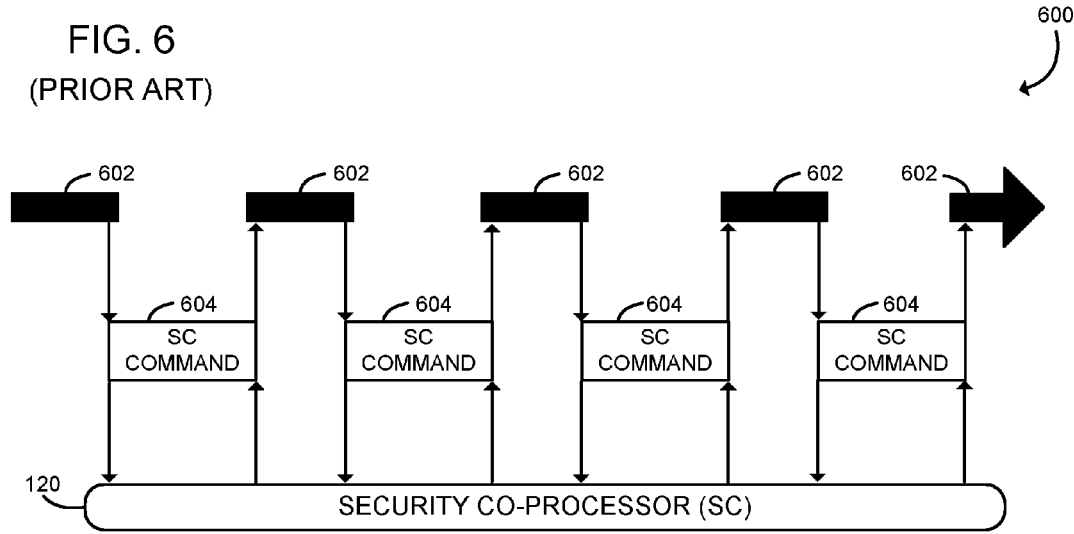
FIG. 6 is a simplified flow diagram of a boot flow for a traditional system.

Referring now to FIGS. 5 and 6, a boot flow 502 for the computing device 100 implementing the method 300 for improved platform initialization is illustratively shown in FIG. 5, whereas a boot flow 602 for the computing device 100 implementing a traditional method for platform initialization is shown in FIG. 6. As shown in FIG. 5, the boot flow 502 is generally continuous when implementing the platform initialization for the computing device 100 as described herein. As discussed above, when the BIOS module 204 encounters a security co-processor command 504 when initializing the platform, the command 504 is transmitted to the security co-processor driver module 202 for execution by the security co-processor 120. The command 504 is added to a command list of commands 504 awaiting execution and the BIOS module 204 continues platform initialization unrelated to the security co-processor 120. When an established security co-processor interrupt is triggered (e.g., by expiration of a given period of time), the security co-processor interrupt handler 210 determines whether the security co-processor 120 has a response ready to a previously submitted command 504 and, if so, receives the response, forwards the response to the BIOS module 204, and sends the next command 504 in the command list to the security co-processor 120 for execution. As such, there is minimal, or otherwise reduced, latency associated with initializing the security co-processor 120. However, as illustratively shown in FIG. 6, the traditional method of initializing the security co-processor 120 involves substantial time delays associated with waiting for a response from the security co-processor 120 for each submitted command 604. Specifically, when the BIOS module 204 encounters a security co-processor command 604, the command 604 is transmitted to the security co-processor 120. The BIOS module 204 must wait for a response from the security co-processor 120 for the submitted command 604 before continuing platform initialization. Because initialization of the security co-processor 120 typically involves the execution of several (e.g., twenty or more) security co-processor commands 604, the latency is significant when implementing traditional platform initialization. For example, in the case of a TPM, the "TpmSelfTest" command must be sent to the TPM during the PEI (Pre Extensible Firmware Interface Initialization) BIOS phase, which takes a significant amount to receive a response from the TPM.

EXAMPLES

Illustrative examples of the devices, systems, and methods disclosed herein are provided below. An embodiment of the devices, systems, and methods may include any one or more, and any combination of, the examples described below.

Example 1 includes a computing device for improving platform initialization, the computing device comprising a security co-processor to execute security co-processor commands submitted thereto; a basic input/output system module to begin initialization of a platform of the computing device; a security co-processor driver module to add a security co-processor command to a command list in response to receipt of the security co-processor command from the basic input/output system module; and a timer module to establish a periodic interrupt of the initialization of the platform, wherein the security co-processor driver module is further to, in response to an occurrence of the periodic interrupt, (i) query the security co-processor regarding an availability of a security co-processor response to a prior submitted security co-processor command and (ii) forward, in response to receipt of an available security co-processor response, the available security co-processor response to the basic input/output system module.

Example 2 includes the subject matter of Example 1, and wherein the security co-processor driver module is further to submit the next security co-processor command in the command list to the security co-processor in response to receipt of the available security co-processor response.

Example 3 includes the subject matter of any of Examples 1 and 2, and wherein the security co-processor comprises a trusted platform module.

Example 4 includes the subject matter of any of Examples 1-3, and wherein the security co-processor comprises a manageability engine.

Example 5 includes the subject matter of any of Examples 1-4, and wherein the security co-processor comprises a converged security engine.

Example 6 includes the subject matter of any of Examples 1-5, and wherein the security co-processor comprises an out-of-band processor.

Example 7 includes the subject matter of any of Examples 1-6, and wherein the basic input/output module is further to continue initialization of the platform in response to a return from the periodic interrupt.

Example 8 includes the subject matter of any of Examples 1-7, and wherein the timer module is further to discontinue periodic interruption of the initialization in response to completion of initialization procedures not involving the security co-processor commands.

Example 9 includes the subject matter of any of Examples 1-8, and wherein the security co-processor driver module is further to, in response to completion of the initialization procedures not involving the security co-processor commands, (i) submit each security co-processor command remaining in the command list to the security co-processor and (ii) forward, in response to receipt of an available security co-processor response to one of the remaining security co-processor commands, the available security co-processor response to the basic input/output system module for each of the remaining security co-processor commands.

Example 10 includes the subject matter of any of Examples 1-9, and wherein the basic input/output system module is further to boot an operating system of the computing device in response to completion of initialization procedures.

Example 11 includes the subject matter of any of Examples 1-10, and wherein the command list follows a first in, first out system.

Example 12 includes the subject matter of any of Examples 1-11, and wherein the command list follows a last in, first out system.

Example 13 includes a method for improving platform initialization of a computing device, the method comprising commencing initialization of a platform of the computing device using a basic input/output system of the computing device; receiving, with a security co-processor driver of the computing device and from the basic input/output system, a security co-processor command to be executed by a security co-processor of the computing device; adding, with the security co-processor driver, the security co-processor command to a command list in response to receiving the security co-processor command; and interrupting, with the computing device, the initialization of the platform periodically to (i) query the security co-processor regarding an availability of a security co-processor response to a prior submitted security co-processor command and (ii) forward, in response to receiving an available security co-processor response, the available security co-processor response to the basic input/output system module.

Example 14 includes the subject matter of Example 13, and wherein interrupting the initialization of the platform comprises submitting the next security co-processor command in the command list to the security co-processor in response to receiving the available security co-processor response.

Example 15 includes the subject matter of any of Examples 13 and 14, and wherein receiving the security co-processor command comprises receiving, with a trusted platform module driver of the computing device and from the basic input/output system, a trusted platform module command to be executed by a trusted platform module of the computing device; wherein adding the security co-processor command to the command list comprises adding, with the trusted platform module driver, the trusted platform module command to a command list in response to receiving the trusted platform module command; and wherein interrupting the initialization of the platform comprises interrupting, with the computing device, the initialization of the platform periodically to (i) query the trusted platform module regarding an availability of a trusted platform module response to a prior submitted trusted platform module command and (ii) forward, in response to receiving an available trusted platform module response, the available trusted platform module response to the basic input/output system module.

Example 16 includes the subject matter of any of Examples 13-15, and wherein interrupting the initialization of the platform comprises submitting the next trusted platform module command in the command list to the trusted platform module in response to receiving the available trusted platform module response.

Example 17 includes the subject matter of any of Examples 13-16, and wherein receiving the security co-processor command comprises receiving, with a manageability engine driver of the computing device and from the basic input/output system, a manageability engine command to be executed by a manageability engine of the computing device; wherein adding the security co-processor command to the command list comprises adding, with the manageability engine driver, the manageability engine command to a command list in response to receiving the manageability engine command; and wherein interrupting the initialization of the platform comprises interrupting, with the computing device, the initialization of the platform periodically to (i) query the manageability engine regarding an availability of a manageability engine response to a prior submitted manageability engine command and (ii) forward, in response to receiving an available manageability engine response, the available manageability engine response to the basic input/output system module.

Example 18 includes the subject matter of any of Examples 13-17, and wherein receiving the security co-processor command comprises receiving, with a converged security engine driver of the computing device and from the basic input/output system, a converged security engine command to be executed by a converged security engine of the computing device; wherein adding the security co-processor command to the command list comprises adding, with the converged security engine driver, the converged security engine command to a command list in response to receiving the converged security engine command; and wherein interrupting the initialization of the platform comprises interrupting, with the computing device, the initialization of the platform periodically to (i) query the converged security engine regarding an availability of a converged security engine response to a prior submitted converged security engine command and (ii) forward, in response to receiving an available converged security engine response, the available converged security engine response to the basic input/output system module.

Example 19 includes the subject matter of any of Examples 13-18, and further including continuing, on the computing device, initialization of the platform in response to returning from the periodic interrupt.

Example 20 includes the subject matter of any of Examples 13-19, and further including discontinuing, on the computing device, periodic interruption of the initialization in response to completing initialization procedures not involving the security co-processor commands.

Example 21 includes the subject matter of any of Examples 13-20, and further including submitting, with the computing device and in response to completing the initialization procedures not involving the security co-processor commands, each security co-processor command remaining in the command list to the security co-processor; and forwarding, with the computing device and in response to receiving an available security co-processor response to one of the remaining security co-processor commands, the available security co-processor response to the basic input/output system for each of the remaining security co-processor commands.

Example 22 includes the subject matter of any of Examples 13-21, and further including booting, on the computing device, an operating system of the computing device in response to completing the initialization procedures.

Example 23 includes the subject matter of any of Examples 13-22, and wherein submitting the next security co-processor command in the command list to the security co-processor comprises submitting the next security co-processor command in the command list to the security co-processor on a first in, first out basis.

Example 24 includes the subject matter of any of Examples 13-23, and wherein submitting the next security co-processor command in the command list to the security co-processor comprises submitting the next security co-processor command in the command list to the security co-processor on a last in, first out basis.

Example 25 includes a computing device comprising a processor; and a memory having stored therein a plurality of instructions that when executed by the processor cause the computing device to perform the method of any of Examples 13-24.

Example 26 includes one or more machine readable storage media comprising a plurality of instructions stored thereon that, in response to being executed, result in a computing device performing the method of any of Examples 13-24.

Example 27 includes a computing device for improving platform initialization, the computing device comprising means for commencing initialization of a platform of the computing device using a basic input/output system of the computing device; means for receiving, with a security co-processor driver of the computing device and from the basic input/output system, a security co-processor command to be executed by a security co-processor of the computing device; means for adding, with the security co-processor driver, the security co-processor command to a command list in response to receiving the security co-processor command; and means for interrupting the initialization of the platform periodically to (i) query the security co-processor regarding an availability of a security co-processor response to a prior submitted security co-processor command and (ii) forward, in response to receiving an available security co-processor response, the available security co-processor response to the basic input/output system module.

Example 28 includes the subject matter of Example 27, and wherein the means for interrupting the initialization of the platform comprises means for submitting the next security co-processor command in the command list to the security co-processor in response to receiving the available security co-processor response.

Example 29 includes the subject matter of any of Examples 27 and 28, and wherein the means for receiving the security co-processor command comprises means for receiving, with a trusted platform module driver of the computing device and from the basic input/output system, a trusted platform module command to be executed by a trusted platform module of the computing device; wherein the means for adding the security co-processor command to the command list comprises means for adding, with the trusted platform module driver, the trusted platform module command to a command list in response to receiving the trusted platform module command; and wherein the means for interrupting the initialization of the platform comprises means for interrupting the initialization of the platform periodically to (i) query the trusted platform module regarding an availability of a trusted platform module response to a prior submitted trusted platform module command and (ii) forward, in response to receiving an available trusted platform module response, the available trusted platform module response to the basic input/output system module.

Example 30 includes the subject matter of any of Examples 27-29, and wherein the means for interrupting the initialization of the platform comprises means for submitting the next trusted platform module command in the command list to the trusted platform module in response to receiving the available trusted platform module response.

Example 31 includes the subject matter of any of Examples 27-30, and wherein the means for receiving the security co-processor command comprises means for receiving, with a manageability engine driver of the computing device and from the basic input/output system, a manageability engine command to be executed by a manageability engine of the computing device; wherein the means for adding the security co-processor command to the command list comprises means for adding, with the manageability engine driver, the manageability engine command to a command list in response to receiving the manageability engine command; and wherein the means for interrupting the initialization of the platform comprises means for interrupting the initialization of the platform periodically to (i) query the manageability engine regarding an availability of a manageability engine response to a prior submitted manageability engine command and (ii) forward, in response to receiving an available manageability engine response, the available manageability engine response to the basic input/output system module.

Example 32 includes the subject matter of any of Examples 27-31, and wherein the means for receiving the security co-processor command comprises means for receiving, with a converged security engine driver of the computing device and from the basic input/output system, a converged security engine command to be executed by a converged security engine of the computing device; wherein the means for adding the security co-processor command to the command list comprises means for adding, with the converged security engine driver, the converged security engine command to a command list in response to receiving the converged security engine command; and wherein the means for interrupting the initialization of the platform comprises means for interrupting the initialization of the platform periodically to (i) query the converged security engine regarding an availability of a converged security engine response to a prior submitted converged security engine command and (ii) forward, in response to receiving an available converged security engine response, the available converged security engine response to the basic input/output system module.

Example 33 includes the subject matter of any of Examples 27-32, and further including means for continuing initialization of the platform in response to returning from the periodic interrupt.

Example 34 includes the subject matter of any of Examples 27-33, and further including means for discontinuing periodic interruption of the initialization in response to completing initialization procedures not involving the security co-processor commands.

Example 35 includes the subject matter of any of Examples 27-34, and further including means for submitting, in response to completing the initialization procedures not involving the security co-processor commands, each security co-processor command remaining in the command list to the security co-processor; and means for forwarding, in response to receiving an available security co-processor response to one of the remaining security co-processor commands, the available security co-processor response to the basic input/output system for each of the remaining security co-processor commands.

Example 36 includes the subject matter of any of Examples 27-35, and further means for comprising booting an operating system of the computing device in response to completing the initialization procedures.

Example 37 includes the subject matter of any of Examples 27-36, and wherein the means for submitting the next security co-processor command in the command list to the security co-processor comprises means for submitting the next security co-processor command in the command list to the security co-processor on a first in, first out basis.

Example 38 includes the subject matter of any of Examples 27-37, and wherein the means for submitting the next security co-processor command in the command list to the security co-processor comprises means for submitting the next security co-processor command in the command list to the security co-processor on a last in, first out basis.

The invention claimed is:

1. A computing device for improving platform initialization, the computing device comprising one or more hardware processor to implement:
a security co-processor to execute security co-processor commands submitted thereto;
a basic input/output system module to begin initialization of a platform of the computing device;
a security co-processor driver module to add a security co-processor command to a command list in response to receipt of the security co-processor command from the basic input/output system module, wherein the basic input/output system module is to send the security co-processor command to the security co-processor driver module during the initialization of the platform; and
a timer module to establish a periodic interrupt of the initialization of the platform in response to beginning of initialization of the platform,
wherein the security co-processor driver module is further to, in response to an occurrence of the periodic interrupt, (i) query the security co-processor regarding an availability of a security co-processor response to a prior submitted security co-processor command (ii) forward, in response to receipt of an available security co-processor response, the available security co-processor response to the basic input/output system module, and (iii) submit, in response to completion of the initialization procedures not involving the security co-processor commands, each security co-processor command remaining in the command list to the security co-processor, and (iv) forward, in response to receipt of an available security co-processor response to one of the remaining security co-processor commands, the available security co-processor response to the basic input/output system module for each of the remaining security co-processor commands.

2. The computing device of claim 1, wherein the security co-processor driver module is further to submit the next security co-processor command in the command list to the security co-processor in response to receipt of the available security co-processor response.

3. The computing device of claim 1, wherein the security co-processor comprises a trusted platform module.

4. The computing device of claim 1, wherein the security co-processor comprises a manageability engine.

5. The computing device of claim 1, wherein the security co-processor comprises a converged security engine.

6. The computing device of claim 1, wherein the security co-processor comprises an out-of-band processor.

7. The computing device of claim 1, wherein the basic input/output module is further to continue initialization of the platform in response to a return from the periodic interrupt.

8. The computing device of claim 1, wherein the timer module is further to discontinue periodic interruption of the initialization in response to completion of initialization procedures not involving the security co-processor commands.

9. The computing device of claim 8, wherein the basic input/output system module is further to boot an operating system of the computing device in response to completion of initialization procedures.

10. The computing device of claim 1, wherein the command list follows a first in, first out system.

11. The computing device of claim 1, wherein the command list follows a last in, first out system.

12. A method for improving platform initialization of a computing device, the method comprising:
commencing initialization of a platform of the computing device using a basic input/output system of the computing device;
receiving, with a security co-processor driver of the computing device and from the basic input/output system during initialization of the platform, a security co-processor command to be executed by a security co-processor of the computing device;
adding, with the security co-processor driver, the security co-processor command to a command list in response to receiving the security co-processor command; and
interrupting, with the computing device, the initialization of the platform periodically in response to commencing initialization of the platform to (i) query the security co-processor regarding an availability of a security co-processor response to a prior submitted security co-processor command (ii) forward, in response to receiving an available security co-processor response, the available security co-processor response to the basic input/output system module (iii) submitting with the computing device and in response to completing the initialization procedures not involving the security co-processor commands, each security co-processor command remaining in the command list to the security co-processor; and forwarding with the computing device and in response to receiving an available security co-processor response to one of the remaining security co-processor commands, the available security co-processor response to the basic input/output system for each of the remaining security co-processor commands.

13. The method of claim 12, wherein interrupting the initialization of the platform comprises submitting the next security co-processor command in the command list to the security co-processor in response to receiving the available security co-processor response.

14. The method of claim 12, wherein receiving the security co-processor command comprises receiving, with a trusted platform module driver of the computing device and from the basic input/output system, a trusted platform module command to be executed by a trusted platform module of the computing device;
wherein adding the security co-processor command to the command list comprises adding, with the trusted platform module driver, the trusted platform module command to a command list in response to receiving the trusted platform module command; and
wherein interrupting the initialization of the platform comprises interrupting, with the computing device, the initialization of the platform periodically to (i) query the trusted platform module regarding an availability of a trusted platform module response to a prior submitted trusted platform module command and (ii) forward, in response to receiving an available trusted platform module response, the available trusted platform module response to the basic input/output system module.

15. The method of claim 14, wherein interrupting the initialization of the platform comprises submitting the next trusted platform module command in the command list to the trusted platform module in response to receiving the available trusted platform module response.

16. The method of claim 12, further comprising continuing, on the computing device, initialization of the platform in response to returning from the periodic interrupt.

17. The method of claim 12, further comprising discontinuing, on the computing device, periodic interruption of the initialization in response to completing initialization procedures not involving the security co-processor commands.

18. The method of claim 17, further comprising booting, on the computing device, an operating system of the computing device in response to completing the initialization procedures.

* * * * *